April 26, 1949.　　　S. I. LEIGER　　　2,468,215
BUBBLE LEVEL SUPPORT
Filed Aug. 13, 1946
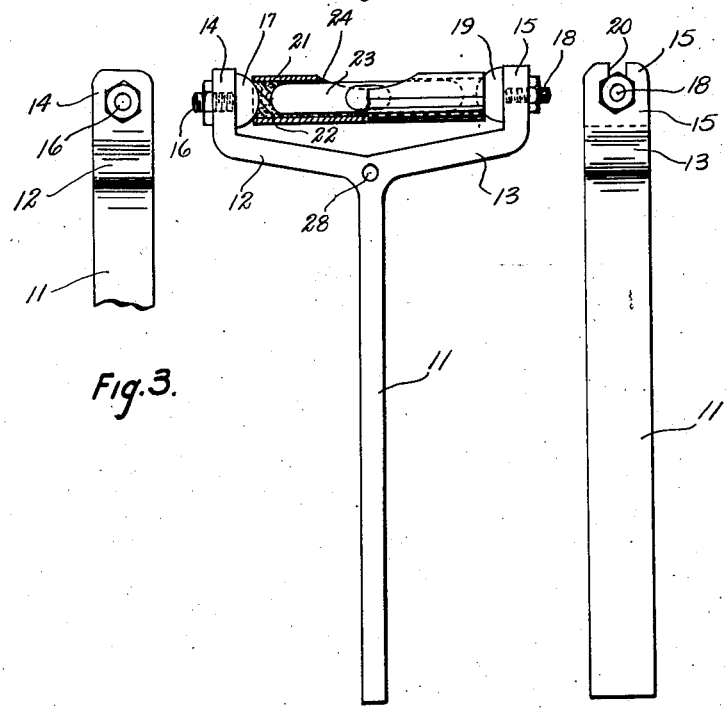
STANLEY I. LEIGER,
INVENTOR
BY
ATTORNEYS Patented Apr. 26, 1949

2,468,215

UNITED STATES PATENT OFFICE 2,468,215

BUBBLE LEVEL SUPPORT

Stanley I. Leiger, Auburn, N. Y.

Application August 13, 1946, Serial No. 690,129

1 Claim. (Cl. 33—207)

This invention relates to gauging instruments and more particularly to an instrument for use with turning tools to determine a centered position of a turning tool with respect to a work piece.

A main object of the invention is to provide a novel and improved work centering instrument for turning tools, said instrument being very simple in structure, easy to use, and very accurate in performance.

A further object of the invention is to provide an improved centering gauge device for turning tools, said device being composed of a few inexpensive parts which are very easy to assemble and providing an accurate, readily observable indication of the position of the turning tool with respect to the horizontal center of the work piece when employed in the manner to be described.

Further objects and advantages of the invention will become apparent from the following description and claim, and from the accompanying drawings, wherein:

Figure 1 is a front elevational view of a gauging device constructed in accordance with the present invention.

Figure 2 is a side elevational view of the device of Figure 1, taken at one side thereof.

Figure 3 is a side elevational view of the upper portion of the other side of the device of Figure 1.

Figure 4 is a front elevational view of a shield device adapted to cover the upper portion of the device of Figure 1.

In lathe work, it is very important to set the cutting tool at exact center height with respect to the work piece inasmuch as even a slight error in setting causes vibration or chatter during the turning operation. According to the prior art, the tool has been adjusted to proper height by placing a pocket scale or other straight metal strip between the edge of the tool and the work and frictionally engaging the strip with light tool pressure. If the height is incorrect the scale or metal strip tilts forward or backward. When the tool is adjusted to exact center height the strip is precisely vertical.

In the method described above, it is difficult to determine with accuracy whether or not the metal strip is exactly vertical. The present invention overcomes this difficulty.

Referring to the drawings, 11 designates a straight strip of rigid material adapted to be positioned between the tool edge and the work piece according to the above described method. Strip 11 is rectangular in cross-section. The upper end of strip 11 carries bracket arms 12 and 13, said arms extending laterally in a plane normal to the planes of the wider surfaces of strip 11. Arm 12 has a vertical top portion 14 and arm 13 has a vertical top portion 15 opposing portion 14. Secured to portion 14 is a bolt 16 having an inwardly facing hemispherical head 17. Secured to portion 15 is a similar bolt 18 having an inwardly facing hemispherical head 19. Portion 15 is vertically slotted at 20 to permit vertical adjustment of bolt 18.

Supported at its ends by heads 17 and 19 is a metal tube 21 containing filler material 22, such as plaster of paris, in which is embedded a level tube 23. Tube 21 is cut away at 24 to expose the upper middle portion of level tube 23 so that the level bubble will be visible.

A shield 25 is provided formed with depending parallel flanges adapted to fit over the upper portion of the device, said shield having a central recess 26 in its upper portion through which the level tube 23 will be visible when the shield is in protective position on the device. Said shield is adapted to be secured to the device by a bolt 27 which passes through the depending flanges of the shield and through an opening 28 formed in strip 11 at the junction of bracket arms 12 and 13.

In operation, the level bubble is observed while the tool is being vertically adjusted. When the level bubble is centered, strip 11 is exactly vertical and the tool is at exact center height with respect to the work.

While a specific embodiment of a tool centering gauge device for lathe work has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

In a turning tool height-adjusting gauge device for aligning a tool with the axis of rotation of a work piece and including a straight rigid member adapted to be positioned between the tool edge and the work piece during tool adjustment whereby to be held in position against said work piece by tool pressure, the improvement comprising a pair of opposed bracket arms carried at the upper end of said member in a vertical plane normal to the axis of said work piece, an inwardly-facing hemispherical support element carried by each bracket arm, means for vertically adjusting at least one of said support elements, a rigid tube having opposite open ends rotatably seated against said support elements and supported thereby, a spirit level fixed in said tube, and said tube being formed with a central sight opening for viewing said level.

STANLEY I. LEIGER.

REFERENCES CITED

The following references are of record in the file of this patent:

UNITED STATES PATENTS

| Number | Name | Date |
| --- | --- | --- |
| 449,609 | Green | Mar. 31, 1891 |
| 1,224,836 | Blainer | May 1, 1917 |
| 2,102,364 | Langsner | Dec. 14, 1937 |
| 2,268,758 | Martin | Jan. 6, 1942 |